(12) United States Patent
Fukuda

(10) Patent No.: US 8,715,578 B2
(45) Date of Patent: May 6, 2014

(54) EXHAUST GAS PURIFYING APPARATUS

(71) Applicant: Takashi Fukuda, Ageo (JP)

(72) Inventor: Takashi Fukuda, Ageo (JP)

(73) Assignee: UD Trucks Corporation, Ageo-shi (JP)

( * ) Notice: Subject to any disclaimer, the term of this patent is extended or adjusted under 35 U.S.C. 154(b) by 0 days.

(21) Appl. No.: 13/650,815

(22) Filed: Oct. 12, 2012

(65) Prior Publication Data

US 2013/0039817 A1    Feb. 14, 2013

Related U.S. Application Data

(63) Continuation of application No. PCT/JP2010/071383, filed on Nov. 30, 2010.

(30) Foreign Application Priority Data

Apr. 15, 2010 (JP) ................................. 2010-094017

(51) Int. Cl.
*B01D 50/00* (2006.01)

(52) U.S. Cl.
USPC .......................................... 422/170; 422/177

(58) Field of Classification Search
CPC ... F01N 12/1805; F01N 12/1855; F01N 3/24; F01N 3/2066
USPC ......................................... 422/177, 180, 170
See application file for complete search history.

(56) References Cited

U.S. PATENT DOCUMENTS

2010/0178215 A1    7/2010    Honda et al.
2010/0205945 A1    8/2010    Kowada

FOREIGN PATENT DOCUMENTS

| JP | 2009-085064 A | 4/2009 |
| JP | 2009-108685 A | 5/2009 |
| JP | 2010-043572 A | 2/2010 |
| JP | 2010-071207 A | 4/2010 |

*Primary Examiner* — Tom Duong
(74) *Attorney, Agent, or Firm* — Foley & Lardner LLP

(57) ABSTRACT

An exhaust gas purifying apparatus has a first housing including a DOC converter and DPF, and a second housing including an SCR converter, the housings disposed in parallel on the outer side of a frame such that the exhaust upstream ends thereof are positioned on the outer side in the vehicle width direction. An outlet port of the first housing and an inlet port of the second housing are communicatively connected through a communication pipe. The first housing is dividable into a first casing accommodating the DOC converter and a second casing accommodating the DPF, the two casings separably fastened by bolts. The inlet port of the first casing housing is bent inwardly in the width direction and detachably fastened to an exhaust pipe, the distal end of which opens outwardly in the width direction, through bolts. The second casing and housing are fixed to the frame through two brackets.

6 Claims, 3 Drawing Sheets

EXHAUST GAS PURIFYING APPARATUS

This application is a continuation of PCT/JP2010/071383, filed on Nov. 30, 2010.

TECHNICAL FIELD

The present invention relates to an exhaust gas purifying apparatus for purifying PM (Particulate Matter) and NOx (nitrogen oxide) in an exhaust gas.

BACKGROUND ART

As a compact exhaust gas purifying apparatus for purifying PM and NOx in an exhaust gas, there has been known one that has a casing, which houses a diesel oxidation catalyst (DOC) converter and a diesel particulate filter (DPF) and a casing, which houses a selective catalytic reduction (SCR) converter, the two casings being arranged in parallel in the direction of the vehicle width on the outer side of a frame, as disclosed in Japanese Laid-Open Patent Publication No. 2009-108685 (Patent Document 1).

CITATION LIST

Patent Document

[Patent Document 1]
Japanese Laid-Open Patent Publication No. 2009-108685

SUMMARY OF THE INVENTION

Technical Problem

In an exhaust gas purifying apparatus which has a DOC converter and a DPF, $NO_2$ (nitrogen dioxide) generated by the DOC converter is used to perform DPF recycling. If, for example, an exhaust gas temperature continues to remain lower than a recycling temperature, then incomplete DPF recycling may occur, resulting in clogging thereof. Thus, considering that the DPF must be inspected and cleaned as necessary, the prior art has been devised to allow only the casing that houses the DOC converter and the DPF to be easily detached from a vehicle body, leaving the casing that houses the SCR converter on the vehicle body.

However, even when only the casing that houses the DOC converter and the DPF can be removed from the vehicle body, the casing still has to be disassembled to take the DPF out, so that man-hour (amount of work) is large. Especially in the case of a heavy vehicle, the casing that houses the DOC converter and the DPF is large and heavy, so that the work itself to detach the casing from the vehicle body has been painstaking.

The present invention has been made in view of the problem with the prior art, and it is an object of the invention to provide an exhaust gas purifying apparatus that permits a DPF to be easily removable.

Solution to Problem

Therefore, an exhaust gas purifying apparatus has, on the outer side of a frame that extends in a longitudinal direction of a vehicle body, a cylindrical first housing that houses a DOC converter and a DPF in this order in an exhaust gas flow direction, and a cylindrical second housing that houses an SCR converter which selectively reduces and purifies a nitrogen oxide in an exhaust gas by using ammonia, the two housings being disposed in parallel such that an exhaust upstream end of each thereof is positioned on the outer side in a vehicle width direction, in which an exhaust stream outlet port of the first housing and an exhaust stream inlet port of the second housing are communicatively connected through a communication pipe. The first housing is configured to be dividable into two parts, that is, a first casing that houses the DOC converter and a second casing that detachably houses the DPF. The first casing and the second casing are separably fastened through a plurality of first fastening members that are accessible from the outer side in the vehicle width direction, and the an exhaust stream inlet port in the first housing is formed by being bent inwards in the vehicle width direction and is detachably fastened, through a second fastening member accessible from the outer side in the vehicle width direction, to an exhaust pipe having a distal end thereof opened toward the outer side in the vehicle width direction. The second casing, which constitutes the first housing, and the second housing are fixed to an outer surface of the frame through a bracket.

Advantageous Effects of the Invention

The DPF is removed from the exhaust gas purifying apparatus according to the following steps. The first fastening members which fasten the first casing and the second casing in the first housing are removed, and the second fastening member which fastens the exhaust stream inlet port in the first housing to the exhaust pipe is removed. This work is not very difficult, because the first fastening members and the second fastening member can be reached from the outer side in the vehicle width direction. Then, pulling the first casing toward the outer side in the vehicle width direction allows the first casing to be removed while leaving the second casing in the first housing and the second housing still mounted on the vehicle body. Subsequently, pulling the DPF toward the outer side in the vehicle width direction allows the DPF to be easily removed from the second casing. The exhaust gas purifying apparatus can be reassembled by reversing the procedure for removing the DPF.

DESCRIPTION OF EMBODIMENTS

Hereinafter is a detailed description of an embodiment for implementing the present invention with reference to the accompanying drawings.

Figure 1:
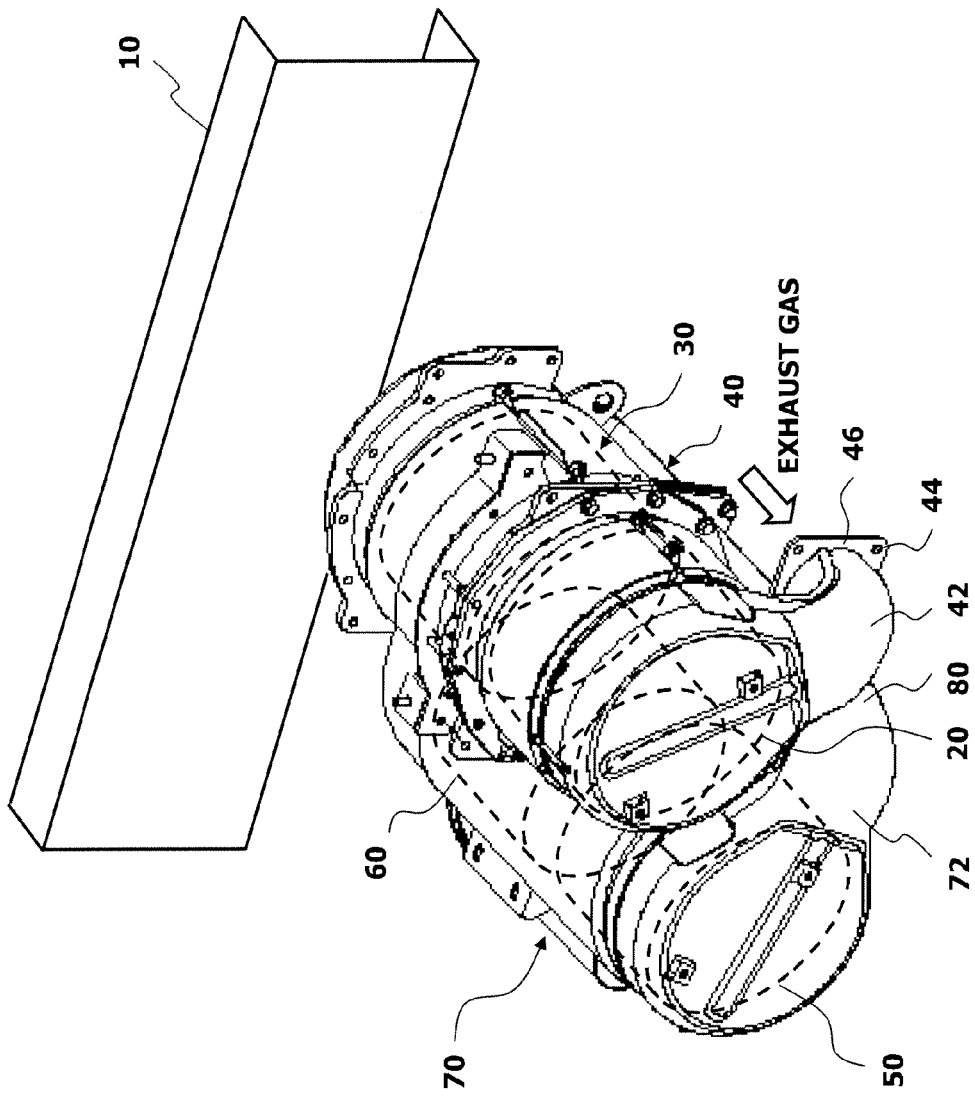
FIG. 1 is a perspective view illustrating an example of an exhaust gas purifying apparatus which embodies the present invention.

FIG. 1 illustrates an example of an exhaust gas purifying apparatus.

On an outer side in the vehicle width direction of a ladder-type frame 10 extending in the longitudinal direction of a vehicle body, a substantially cylindrical first housing 40, which houses a DOC converter 20 and a DPF 30, and a second housing 70, which houses an SCR converter 50 and an oxidation catalyst converter 60, are installed closely to each other side by side through brackets (not shown) such that the exhaust upstream ends thereof are directed to the outer side in the vehicle width direction. In the first housing 40, the DOC converter 20 disposed on the exhaust upstream side oxidizes a part of NO (nitrogen monoxide) in an exhaust gas, into $NO_2$, while the DPF 30 disposed at an exhaust downstream side collects PM in the exhaust gas and performs recycling by using $NO_2$, thereby permitting continuous purification of PM. In the second housing 70, the SCR converter 50 disposed on the exhaust upstream side uses ammonia generated from a urea aqueous solution serving as a reducing agent precursor to selectively reduce and purify NOx in the exhaust gas, while the oxidation catalyst converter 60 disposed at the exhaust downstream side oxidizes the ammonia that has passed through the SCR converter 50, thereby purifying NOx while restraining the release of the ammonia.

The first housing 40 has an exhaust stream inlet port 42, which bends inward in the vehicle width direction from a side surface at an exhaust upstream end, and an exhaust stream outlet port (not shown) formed in a side surface at an exhaust downstream end. The second housing 70 has an exhaust stream inlet port 72 formed in a side surface at the exhaust upstream end and an exhaust stream outlet port (not shown), which bends outward in the vehicle width direction from a side surface at the exhaust downstream end. Furthermore, the exhaust stream outlet port of the first housing 40 is communicatively connected to the exhaust stream inlet port 72 of the second housing 70 through a communication pipe 80, which has a linear portion extending substantially parallel to the axis of the first housing 40. At the end of an opening of the exhaust stream inlet port 42 of the first housing 40, a flange 46 is formed. The flange 46 is shaped substantially like a rectangle with rounded corners and which has bolt insertion holes 44 at its four corners for bolts which are examples of the second fastening member. Thus, the flange 46 is fastened to the exhaust pipe of a diesel engine so as to be removable. The flange 46 is not limited to the substantially rectangular shape with rounded corners but includes, for example, an annular shape.

Furthermore, to the communication pipe 80 positioned in the vicinity of the exhaust stream outlet port in the first housing 40, an injection nozzle (not shown) for supplying and injecting the urea aqueous solution substantially along the axis of the linear portion of the communication pipe 80 is attached. This arrangement leads the urea aqueous solution, which has been supplied by being injected through the injection nozzle, to pass through the linear portion of the communication pipe 80 into the second housing 70, thus making it possible to earn the time for the hydrolysis of the urea aqueous solution and for dispersing and mixing the urea aqueous solution in the exhaust gas and to accelerate the homogenization of the concentration of the ammonia supplied to the SCR converter 50.

Figure 2:
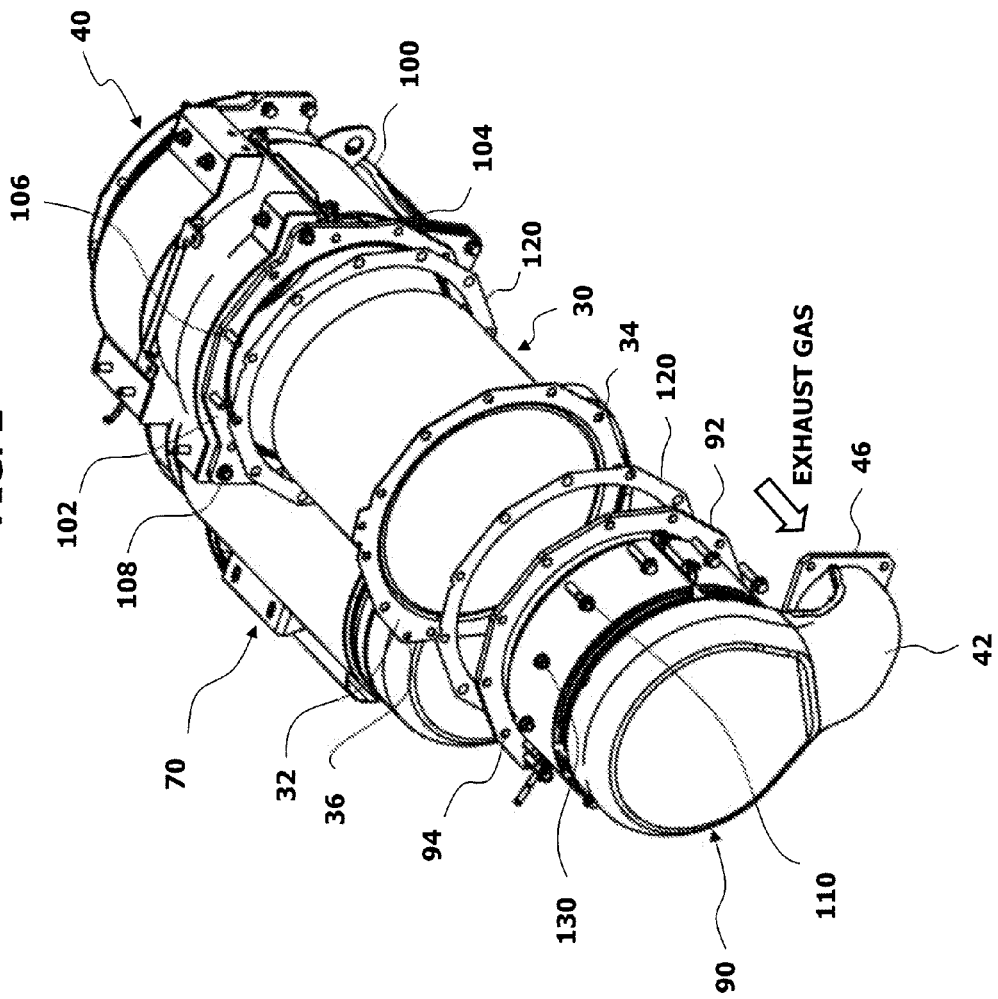
FIG. 2 is a perspective view for explaining a split structure of a first housing.

As illustrated in FIG. 2, the first housing 40 is configured to be dividable into two parts, that is, a first casing 90 for housing the DOC converter 20 and a second casing 100 for detachably housing the DPF 30 which is a cartridge type. At the opening ends of the first casing 90 and the second casing 100, a flange 92 and a flange 102 which extend toward the outer sides of the radiuses of the openings are formed, respectively. Furthermore, in order to detachably fix the DPF 30 to the second casing 100, at one end of the DPF 30 in an axial direction, a flange 32 held between the flange 92 of the first casing 90 and the flange 102 of the second casing 100 is formed. The flanges 92 and 32 of the first casing 90 and the DPF 30 are provided with a plurality of insertion holes 94 and 34 into which the shafts of bolts 110 which are examples of the first fastening member are inserted to detachably fasten the flanges to the second casing 100. Furthermore, the flange 102 of the second casing 100 has a plurality of female screws 104 into which bolts 110, which have been inserted in the insertion holes 94 and 34 of the first casing 90 and the DPF 30, respectively, are screwed. Preferably, a gasket 120 for securing air-tightness is interposed between the flange 92 of the first casing 90 and the flange 32 of the DPF 30 and between the flange 32 of the DPF 30 and the flange 102 of the second casing 100.

Of the plurality of female screws 104 formed in the flange 102 of the second casing 100, at least one (two in the present embodiment) positioned at a vertically upper point when mounted on a vehicle may be replaced by a bolt 106, which is to be welded to the flange 102. The bolt 106 may be inserted into the insertion holes 34 and 94 of the DPF 30 and the first casing 90, respectively, for temporary fastening, thereby permitting easy installation of the DPF 30 and the first casing 90. In this case, nuts 130, which are examples of the first fastening members, may be screwed onto the distal ends of the bolts 106. The bolts 106 are capable of retaining the first casing 90 from falling off when the bolts 110 are removed. Instead of welding the bolts 106, stud bolts may be screwed (buried) in the female screws 104.

Furthermore, in order to preventing the DPF 30 from accidentally falling off when the first casing 90 is detached from the second casing 100, an insertion hole 36 into which a fixing bolt (a third fastening member) is inserted, may be formed in the flange 32 of the DPF 30 and a female screw 108, in which a fixing bolt is screwed, may be formed in the flange 102 of the second casing 100 In other words, the DPF 30 may be detachably fastened to the second casing 100 through a fixing bolt that can be accessed from the outer side in the vehicle width direction.

Figure 3:
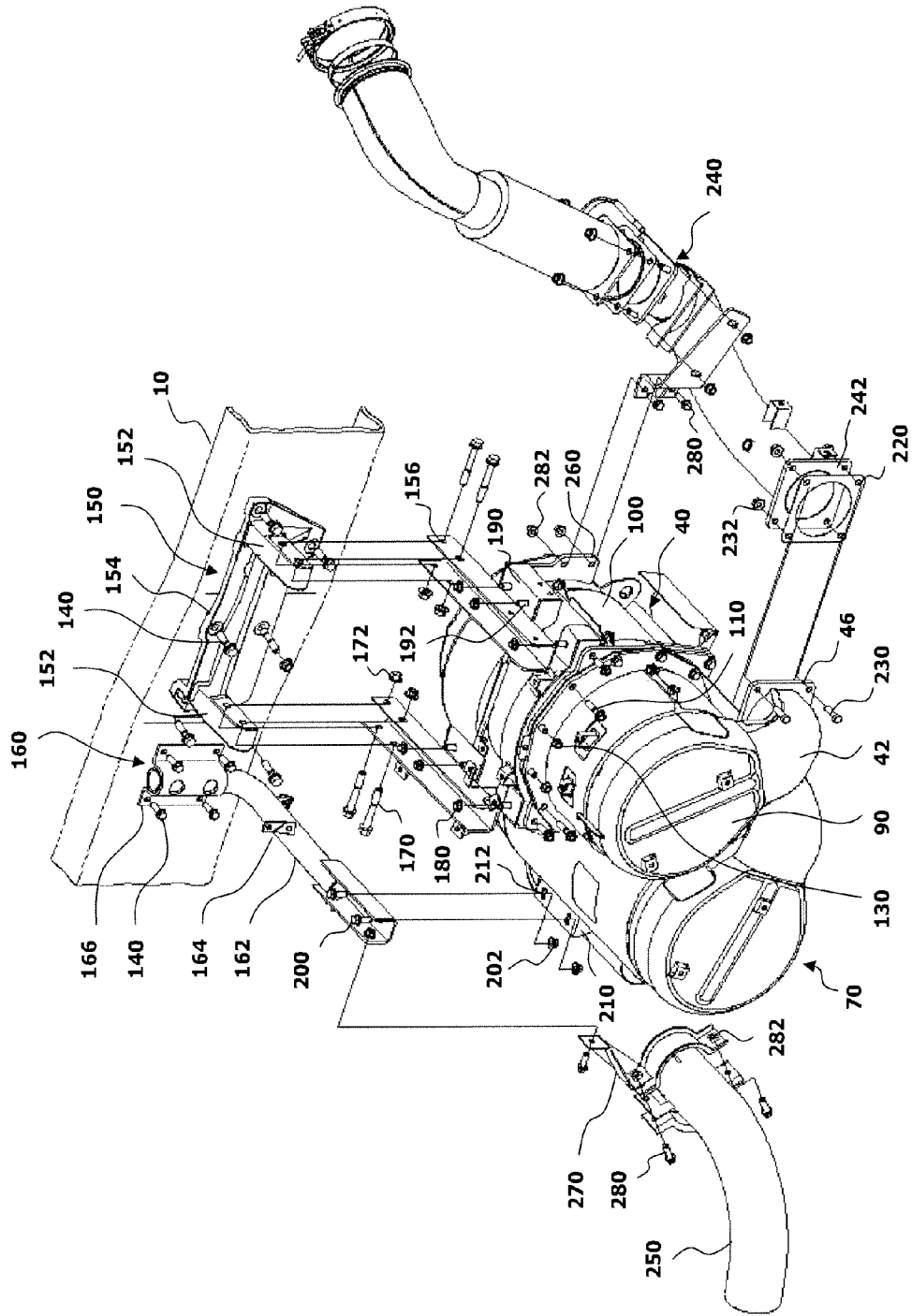
FIG. 3 is a perspective view for explaining an installation structure of the exhaust gas purifying apparatus.

Then, the apparatus for purifying exhaust gas, which includes the first housing 40 and the second housing 70, is installed to the outer surface of the frame 10 by the installation structure illustrated in FIG. 3.

More specifically, a first bracket 150 and a second bracket 160 are detachably fastened to the outer surface of the frame 10, being positioned away from each other in the longitudinal direction of the vehicle body, through bolts 140 which are examples of the fastening members. The first bracket 150 has a first member 154 with a pair of arms 152 formed integrally therewith, which are positioned apart from each other by a predetermined interval in the longitudinal direction of the vehicle body and which extend to the outer side in the vehicle width direction, and second members 156, which are detachably connected to the arms 152 of the first member 154 through bolts 170 and nuts 172 which are examples of the fastening members and which extend to the outer side in the vehicle width direction. Thus, the first member 154 is detachably fastened to the outer surface of the frame 10 through the bolts 140. Furthermore, the second bracket 160 has a substantially L-shaped first member 164, which has an arm 162 extending to the outer side in the vehicle width direction, and a second member 166 for fixing a portion of the L-shaped first member 164, which extends in the vertical direction of the vehicle body, to the frame 10.

Meanwhile, the second casing 100 constituting the first housing 40 has fixing portions 190. The fixing portions 190 detachably fasten the second casing 100 to the second members 156 of the first bracket 150 through nuts 180 which are examples of the fastening members. The fixing portions 190 have upper surfaces, which are shaped to match the bottom surfaces of the second members 156, stud bolts 192 being buried therein. The number of the stud bolts 192 may be appropriately determined, considering, for example, the weight of the apparatus for purifying exhaust gas that includes the first housing 40 and the second housing 70. Furthermore, the second housing 70 has a fixing portion 210.

The fixing portion 210 fixes the second housing 70 to the arm 162 of the first member 164 of the second bracket 160 via bolts 200 and nuts 202 which are examples of the fastening members. The fixing portion 210 has an upper surface that is shaped to match the shape of the bottom surface of the distal end of the arm 162, and insertion holes 212, in which bolts 200 are inserted, are provided therein.

Furthermore, the flange 46 formed at the distal end of an exhaust stream inlet port 42 of the first housing 40 is detachably fastened to a flange 242 formed at the distal end of an exhaust pipe 240, which opens to the outer side in the vehicle width direction, through bolts 230 and nuts 232 which are examples of the second fastening members, with a gasket 220 for securing airtightness being interposed therebetween. The heads of the bolts 230 are positioned on the outer side in the vehicle width direction. Meanwhile, a tail pipe 250, the distal end of which opens in a rearward direction of the vehicle body, is connected to the distal end of the exhaust stream outlet port of the second housing 70.

The second casing 100 of the first housing 40 may be provided with a supporting portion 260, which supports the middle of the exhaust pipe 240, and the proximal end of the tail pipe 250 may be provided with a connecting portion 270 connected with the second bracket 160 so as to enhance the supporting strength of the exhaust pipe 240 and the tail pipe 250 on the vehicle body. In this case, preferably, the first housing 40 and the exhaust pipe 240, and the second bracket 160 and the tail pipe 250 are detachably fastened through bolts 280 and nuts 282 which are examples of the fastening members.

In the apparatus for purifying exhaust gas described above, when the exhaust gas of a diesel engine is introduced into the DOC converter 20, a part of NO in the exhaust gas is oxidized into $NO_2$ and moved to the DPF 30. In the DPF 30, the PM in the exhaust gas is collected and the PM is oxidized by using the $NO_2$ generated by the DOC converter 20, thus continuously carrying out the collection of PM and the regeneration of the DPF 30.

The urea aqueous solution injected through the injection nozzle at a flow rate based on an engine operation state is hydrolyzed by using exhaust heat and the water vapor in the exhaust gas, to be converted into ammonia, which functions as a reducing agent. It is known that the ammonia reacts in selective reduction with NOx of the exhaust gas in the SCR converter 50 so as to be purified into $H_2O$ (water) and $N_2$ (nitrogen gas), which are harmless ingredients. Meanwhile, the ammonia that has passed through the SCR converter 50 is oxidized by the oxidation catalyst converter 60 disposed at the exhaust downstream side, thus making it possible to restrain the ammonia from being directly released into the atmosphere.

To inspect or clean the DPF 30, the bolts 230 and the nuts 232, which connect the exhaust stream inlet port 42 of the first housing 40 to the exhaust pipe 240, are removed and the bolts 110 and the nuts 130, which fasten the first casing 90 to the second casing 100 in the first housing 40 are removed. This work is not very difficult, because the heads of the bolts 110 and the nuts 130 can be reached from the outer side in the vehicle width direction. Then, pulling the first casing 90 of the first housing 40 towards the outer side in the vehicle width direction allows the first casing 90 to be removed while leaving the second casing 100 of the first housing 40 and the second housing 70 still mounted on the vehicle body. Subsequently, pulling the DPF 30 towards the outer side in the vehicle width direction allows the DPF 30 to be easily removed from the second casing 100. After finishing the inspection or cleaning of the DPF 30, the reassembling of the apparatus for purifying exhaust gas can be easily completed by reversing the procedure for removing the DPF 30.

The apparatus for purifying exhaust gas including the first housing 40, the second housing 70, and the tail pipe 250 can be easily removed from the vehicle body by releasing the apparatus from the first bracket 150 and the second bracket 160 and also releasing the exhaust pipe 240.

The first bracket 150 and the second bracket 160 do not have to be structured as described above, as long as they allow the second casing 100 constituting the first housing 40 and the second housing 70 to be installed to the frame 10.

It should be appreciated that the entire contents of Japanese Patent Application No. 2010-094017, filed on Apr. 15, 2010, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

The invention claimed is:

1. An apparatus for purifying exhaust gas, comprising:
a cylindrical first housing, which houses a diesel oxidation catalyst converter and a diesel particulate filter, in this order, in an exhaust gas flowing direction; and
a cylindrical second housing, which houses a selective catalytic reduction converter that employs ammonia to selectively reduce and purify a nitrogen oxide in an exhaust gas, the first and the second housings being disposed on an outer side of a frame that extends in a longitudinal direction of a vehicle body and being arranged in parallel such that an exhaust gas upstream end of each thereof is positioned on the outer side in a vehicle width direction, and an exhaust stream outlet port of the first housing and an exhaust stream inlet port of the second housing being communicatively connected through a communication pipe,
wherein the first housing is configured to be dividable into two parts comprising:
a first casing that houses the diesel oxidation catalyst converter, and
a second casing that detachably houses the diesel particulate filter,
wherein the first casing and the second casing are separably fastened through a plurality of first fastening members that are accessible from the outer side in the vehicle width direction,
wherein an exhaust stream inlet port of the first casing is formed by being bent inwards in the vehicle width direction and is detachably fastened, through a second fastening member accessible from the outer side in the vehicle width direction, to an exhaust pipe having a distal end thereof opened toward the outer side in the vehicle width direction, and
wherein the second casing, which constitutes the first housing, and the second housing are fixed to an outer surface of the frame through a bracket.

2. The apparatus for purifying exhaust gas according to claim 1, wherein at least one first fastening member of the plurality of first fastening members is located at an upper position and comprises a bolt welded to the second casing and a nut screwed to the distal portion thereof.

3. The apparatus for purifying exhaust gas according to claim 1, wherein at least one first fastening member of the plurality of first fastening members is located at an upper position and comprises a stud bolt buried in the second casing and a nut screwed to the distal portion thereof.

4. The apparatus for purifying exhaust gas according to claim 1, wherein the diesel particulate filter is detachably fastened to the second casing through a third fastening member that is accessible from the outer side in the vehicle width direction.

5. The apparatus for purifying exhaust gas according to claim 1, wherein the second housing further includes an oxidation catalyst converter for oxidizing ammonia, which is located at exhaust gas downstream side of the selective catalytic reduction converter.

6. The apparatus for purifying exhaust gas according to claim 1, wherein the first casing is configured to detach by detaching the plurality of first fastening members and the second fastening member.

\* \* \* \* \*